(12) United States Patent
Andrus, Jr. et al.

(10) Patent No.: US 6,352,764 B1
(45) Date of Patent: Mar. 5, 2002

(54) MULTI-LAYER ARTICLES INCLUDING UV-ABSORBING POLYMERIC COMPOSITIONS

(75) Inventors: Milton H. Andrus, Jr., Woodbury; Bret W. Ludwig, Oakdale, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/371,060

(22) Filed: Aug. 9, 1999

(51) Int. Cl.[7] ................................................ B32B 5/16
(52) U.S. Cl. ...................... 428/327; 428/421; 428/407; 428/518; 428/520
(58) Field of Search ............................ 427/181; 264/6, 264/7; 428/323, 403, 407, 421, 518, 522, 327, 520

(56) References Cited

U.S. PATENT DOCUMENTS

| | | | |
|---|---|---|---|
| 4,419,471 A | * 12/1983 | Nelsen et al. ................ 524/100 |
| 4,528,311 A | 7/1985 | Beard et al. ................... 524/91 |
| 4,624,973 A | * 11/1986 | Kuwajima et al. ........... 523/221 |
| 4,952,455 A | 8/1990 | Siol et al. ..................... 428/373 |
| 5,010,121 A | 4/1991 | Yeates et al. ................. 523/336 |
| 5,207,954 A | 5/1993 | Lewis et al. ................... 264/13 |
| 5,237,004 A | * 8/1993 | Wu et al. ....................... 525/85 |
| 5,372,922 A | 12/1994 | Schofield et al. ............ 430/572 |
| 5,461,125 A | 10/1995 | Lu et al. ....................... 525/293 |
| 5,629,365 A | 5/1997 | Razavi ........................... 524/37 |
| 5,646,201 A | 7/1997 | Araki et al. .................. 523/201 |
| 5,712,335 A | 1/1998 | Tsuda et al. .................. 524/269 |
| 5,756,273 A | * 5/1998 | Wang et al. .................. 439/537 |
| 6,251,521 B1 | * 6/2001 | Eian et al. ................. 428/402.21 |

FOREIGN PATENT DOCUMENTS

| | | | |
|---|---|---|---|
| DE | 3 837 588 | 5/1990 | ........... C08J/007/04 |
| EP | 0 788 029 | 8/1997 | ............. G03F/3/10 |
| EP | 0 875 544 A | * 11/1998 | |
| EP | 0 131 468 | 1/1999 | ........... C08F/20/36 |
| JP | 54-003129 | 1/1979 | ......... C08F/008/00 |

(List continued on next page.)

OTHER PUBLICATIONS

J.F. Rabek, "Photostabilization of Polymers," pp. 203–242 (1990). no month.

Segall et al., Core–Shell Structural Latex Particles. II. Synthesis and Characterization of Poly(n–butyl acrylate)/Poly-(benzyl methacrylate–styrene) Structural Latex Particles, J. Applied Polymer Science, vol. 58, pp 401–417 (1995). no month.

Encyclopedia of Polymer Science and Engineering, vol. 3, pp. 758–759 (1988).

"Organic Coatings" Science and Technology, Wicks, Jones, and Pappas, pp. 35–48 (1992). no month.

Encyclopedia of Polymer Science and Engineering, Supplement Volume, pp. 53–59 (1989). no month.

(List continued on next page.)

*Primary Examiner*—Deborah Jones
*Assistant Examiner*—D. Lawrence Tarazano
(74) *Attorney, Agent, or Firm*—Kimberly S. Zillig

(57) ABSTRACT

Described is a multilayer article comprising: a flexible substrate; and, a multiphase polymeric composition comprising a polymeric core phase, a polymeric shell phase and a polymeric film-forming phase; wherein the polymeric core phase comprises an ultraviolet absorber, wherein the polymeric film-forming phase comprises fluoropolymer, and wherein the polymeric core phase and the polymeric film-forming phase do not substantially contact one another, but both the polymeric core phase and the polymeric film-forming phase contact the polymeric shell phase.

19 Claims, 5 Drawing Sheets

FOREIGN PATENT DOCUMENTS

| | | | |
|---|---|---|---|
| JP | 62-093220 | 4/1987 | ......... A61K/007/42 |
| JP | 62-095301 | 5/1987 | ......... C08F/002/22 |
| JP | 4-213348 | 8/1992 | ......... C08L/033/08 |
| JP | 5-230701 | 9/1993 | ......... H02K/003/04 |
| JP | 6-032961 | 2/1994 | ......... C08L/061/00 |
| JP | 6-073368 | 3/1994 | ......... C09K/003/00 |
| JP | 7-188587 | 7/1995 | ......... C09D/005/03 |
| JP | 7-291837 | 11/1995 | ......... A61K/007/02 |
| JP | 8-193180 | 7/1996 | ......... C09D/133/06 |
| JP | 9/255936 | 9/1997 | ......... C09K/003/00 |
| JP | 10-001587 | 1/1998 | ......... C08L/029/04 |
| JP | 10-045854 | 2/1998 | ......... C08F/285/00 |
| JP | 10-120857 | 5/1998 | ......... C08L/027/12 |
| WO | WO 98/18569 | 5/1998 | ............ B05D/7/04 |
| WO | WO 99/03900 | 1/1999 | ............. C08F/8/00 |

OTHER PUBLICATIONS

Sartomer® Chemical Product Listing. p. 19 (undated).

Valet, "Light Stabilizers for Paints," Vincentz Verlag, Hannover, Germany, pp. 18–55 (1997). no month.

Nicholas P. Liberto, "Powder Coating," Powder Coating Institute, Chapter 10 (1994). no month.

J.F. Rabek, "Photostabilization of Polymers," pp. 368–391 (1990). no month.

Zhang et al., "Preparation and Structure Control of poly-(butyl acrylate)/poly(methyl methacrylate) core/shell impact modifier," Department of Chemical Engineering, Jilin Instutute of Technology, Changchun, 130012, Peop. Rep. China. Yingyong Huaxue (1997), 14(3), 93–95, CODEN: YIHUED; ISSN: 100–0518. Journal written in Chinese. CAN 127:136319. no month.

* cited by examiner

MULTI-LAYER ARTICLES INCLUDING UV-ABSORBING POLYMERIC COMPOSITIONS

FIELD OF THE INVENTION

The invention contemplates UV-absorbing compositions including films and coatings, and multilayer articles prepared therefrom.

BACKGROUND

Ultraviolet radiation (UV) can cause degradation of certain materials if exposed. Chemical materials known as ultraviolet absorbers, or UVAs, can be used to protect materials from the damaging effects of UV radiation. A UVA can be incorporated into a material to protect that material from UV radiation, or, a composition that contains UVA can be applied to a UV-sensitive substrate to protect the substrate.

Protective coating compositions, sometimes referred to as "topcoats," can be applied to outdoor-durable materials such as signs based on flexible substrates and optionally having applied graphics, where the coating functions to inhibit dirt buildup or dirt penetration, as a barrier to water, to prevent plasticizers or other ingredients from migrating out of the substrate, or to allow ease of cleaning. A topcoat can include polymeric materials (e.g., a fluoropolymer to provide dirt resistance or cleanability), as well as stabilizers to protect the topcoat or the substrate from degradation, e.g., due to UV radiation. Degradation may involve yellowing, embrittlement, or loss of clarity, gloss, or water resistance.

Unfortunately, while it can be desirable to incorporate a UVA into a protective coating, UVAs can cause some difficult problems. One problem is the relative impermanence of UVAs in many chemical compositions. Non-reactive UVAs can be included in a chemical composition as a dispersed compound, not chemically attached to any other component. These UVAs can be lost from a composition by volatilization during processing (e.g., drying), or by otherwise migrating to the surface of a composition followed by removal as dust or wash off. Loss of the UVA leaves the composition and its substrate less protected from ultraviolet radiation, allowing UV radiation to degrade the composition or substrate. One imperfect remedy to this problem is to include larger amounts of UVA in a composition.

A further problem with UVAs is that they can be incompatible with different polymeric materials (e.g., fluoropolymers). This incompatibility can lead to instability (e.g., thermodynamic instability) or water sensitivity of the composition, which can cause a loss of physical or optical properties, including loss of clarity or increased fogginess. Incompatibility can also cause increased or accelerated loss of UVA by migration, bleeding, or blooming.

Attempts to incorporate UVAs into chemical compositions such as topcoats have been met with a variety of frustrating results, especially when the composition includes an ingredient that is incompatible with the UVA, as are many fluoropolymers. There is a general need to identify ultraviolet absorbing materials and compositions, and also to identify materials that can be used to prepare UV-absorbing compositions such as films and coatings. There is a further need to incorporate UVAs into chemical compositions that contain other materials with which the UVA may not be compatible, wherein the UVA becomes a relatively permanent component of the composition, and wherein the composition is relatively thermodynamically stable, to provide long-term protection from ultraviolet radiation.

SUMMARY OF THE INVENTION

The invention provides multilayer articles comprising a flexible substrate and an ultraviolet radiation absorbing multiphase polymeric composition. The multiphase polymeric composition comprises a polymeric core phase and a polymeric shell phase wherein the polymeric core phase includes ultraviolet absorber.

Preferred multiphase polymeric compositions can exhibit thermodynamic stability and UVA retention, thereby exhibiting time-stable protection from ultraviolet radiation, with lasting physical and mechanical properties. This can be true even if the UVA is used in combination with another material that is not compatible with the UVA.

The multiphase polymeric composition can comprise phase domains of a polymeric core phase, a polymeric shell phase, and a polymeric film-forming phase, wherein the morphology is such that the polymeric core phase does not substantially contact the polymeric film-forming phase, but both of these phases contact the polymeric shell phase, which separates the other two phases. It has been found that compositions having this preferred morphology, particularly if the core particle (or a component thereof) is not compatible with the polymeric film-forming material, can exhibit improved initial physical properties, which can be maintained with aging, as compared to chemical compositions containing chemically identical ingredients, in identical amounts, but exhibiting a different morphology. Such properties can include flexibility, lasting protection from ultraviolet radiation due to reduced migration loss (e.g., bleeding or blooming) of the UVA (especially if the UVA is not chemically attached to the core polymer) thermodynamic stability; and improved resistance to water (e.g., reduced water sensitivity).

A particular advantage of the this preferred morphology is that it allows the use of a core particle or a component thereof, e.g., a polymer or UVA, to be used in a composition that contains another material (e.g., a polymeric film-forming material) that is incompatible with the core particle or core particle component. If a core particle or its component is incompatible with a polymeric film-forming material, the shell material can shield the core particle phase from the incompatible phase, thus preventing the consequences otherwise associated with including the core particle with an incompatible material, and thereby achieving a thermodynamically stable composition.

Multiphase polymeric compositions having the described morphology can be prepared by various methods. For instance, such a multiphase composition can be prepared from a latex that includes polymeric particles having a core/shell structure, wherein the core comprises a UVA, and particles of polymeric film-forming material. This can be accomplished by forming the latex into a film or coating and allowing the latex to dry. Alternatively, such a multiphase composition can be prepared by spray-drying the latex form a powder of agglomerate particles, powder coating the agglomerate particles e.g., onto a flexible substrate, and fusing the coated powder.

An aspect of the invention relates to a multilayer article comprising: a flexible substrate, and a multiphase polymeric composition comprising a polymeric core phase, a polymeric shell phase, and a polymeric film-forming phase, wherein the polymeric core phase comprises an ultraviolet absorber, wherein the polymeric core phase and the polymeric film-forming phase do not substantially contact one another, but both the polymeric core phase and the polymeric film-forming phase contact the polymeric shell. The multiphase polymeric composition can block or absorb ultraviolet radiation and can exhibit desirable cleanability properties, and desired mechanical or physical properties such as flexibility.

Another aspect of the invention relates to a method of preparing a multilayer article comprising a flexible substrate and a multiphase polymeric composition, wherein the multiphase polymeric composition comprises a polymeric core phase, a polymeric shell phase, and a polymeric film-forming phase, and wherein the polymeric core phase comprises an ultraviolet absorber. The method includes steps comprising: powder coating onto a flexible substrate polymeric materials comprising the polymeric core phase, the polymeric shell phase, and the polymeric film-forming phase, and fusing the polymeric materials to form a multiphase polymeric composition wherein the polymeric core phase and the polymeric film-forming phase do not substantially contact one another, but both the polymeric core phase and the polymeric film-forming phase contact the polymeric shell phase.

As used herein, the following terms shall be given the recited meanings:

The term "thermoplastic" means materials that soften or flow upon exposure to heat and/or pressure. Thermoplastic is contrasted with "thermoset," which describes materials that react irreversibly upon heating so that subsequent applications of heat and pressure do not cause them to soften or flow.

"(Meth)acrylate" means either acrylate or methacrylate.

"Phase" is used in a manner not inconsistent with its generally accepted meaning in the chemical art, for instance to refer to a discrete, typically homogeneous component of a chemical composition. "Domain," when referring to a phase of a multiphase composition, refers to individual, continuous or discontinuous, microscopic or macroscopic portions of a phase within the multiphase composition. Examples of discontinuous domains include the following, as illustrated in FIG. 3: individual core particle domains; polymeric shell domains; and fluorochemical domains.

In a multiphase polymeric composition, if individual domains of one phase have an affinity for each other (there is an affinity between separate, individual domains of the same phase) that is significantly greater than the affinity between domains of that phase and domains of a chemically different phase of the composition which the first phase contacts, individual domains of the like phases will be thermodynamically driven to combine with each other, causing polymer segregation and growth in domain size of like phase domains. Phases of a multiphase polymeric composition are referred to as "incompatible" if, while both are contained in a multiphase composition, they tend to combine with each other within the composition to form larger phase domains. If domains of a like phase of a multiphase polymeric composition do in fact form larger-sized phase domains, i.e., the composition suffers gross symptoms of polymer segregation, the multiphase polymeric composition is considered to be "thermodynamically unstable."

Gross symptoms of polymer segregation can include decreased optical clarity, loss of flexibility, embrittlement, and other effects. Polymer segregation within a multiphase polymeric composition can be considered to occur upon a significant loss of clarity or flexibility, or a significant increase in brittleness. These properties can be measured by known methods.

Brittleness can be measured by measuring elongation, with a 20% decrease in elongation being considered significant and indicating polymer segregation and thermodynamic instability.

Clarity can be measured using a Hazemeter. If the result of a haze measurement according to ASTM D1003, upon aging, increases by 10 percentage points, e.g., 5 percentage points or more (e.g., from a reading of 0% to 5%, see the Examples Section and Table 1), it is considered to have lost a significant amount of clarity, and is considered to be thermodynamically unstable.

Flexibility of a multiphase polymeric film composition applied to a flexible substrate can be detected by the following test: samples of the film (approximately 20 to 50 micrometers in thickness) coated onto a substrate (approximately 500 to 600 micrometers in thickness, e.g., 3M PANAFLEX™ 930 Sign and Awning Substrate) (optionally aged e.g., for 1 week at 150 F.). Two samples of the coated film can be cooled to room temperature (about 25° C.), and then bent and creased, one in a direction to cause compression of the coating, and another to cause extension. Creasing can be a fold to 180 degrees, followed by heavy finger pressure along the fold. If the coating visibly cracks, the coating is considered to have lost flexibility. To more easily see cracks, a permanent marker can be applied to the creased coating, and the marker can be washed off with isopropyl alcohol. If a crack is present, the marker will stain the crack and remain visible after washing; if no cracks are present, the marker will wash clean.

DETAILED DESCRIPTION

Figure 1:
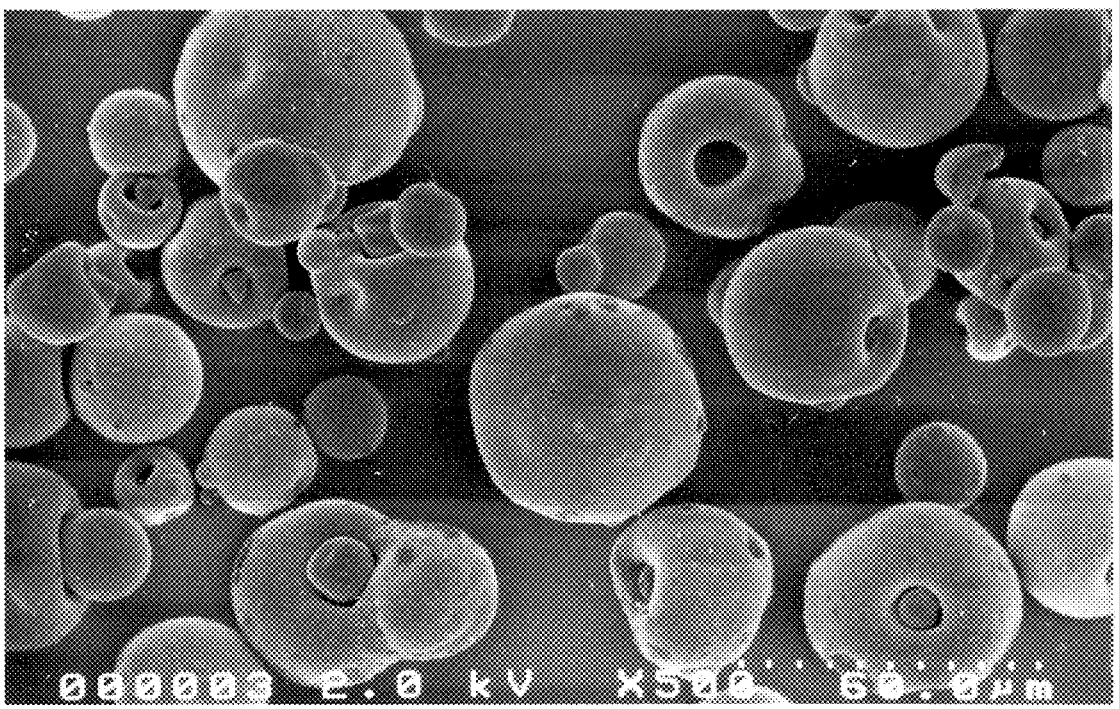
FIG. 1 is an SEM photomicrograph at 2.0 kv×500 magnification of agglomerate particles prepared by spray drying a latex containing core/shell particles and fluoropolymer particles.

Polymeric core/shell particles used in the practice of the invention exhibit a core-shell structure, meaning the particles comprise a polymeric core and a polymeric shell. The polymeric core comprises core polymer and ultraviolet absorber (UVA), which may or may not be chemically incorporated into the core polymer. (The polymeric core can include non-polymeric materials, and may be referred to herein as the "core or "core particle.") These particles are described in Assignee's copending United States Patent Application entitled UV-Absorbing Particles having Ser. No. 09/371,064, which was filed on even date herewith and which is fully incorporated herein by reference.

The core polymer can be chosen to be useful for a specific application of the core/shell particle to provide various physical, chemical, or mechanical properties. The core polymer can be chosen to be a relatively soft or rubbery material, e.g., having a glass transition temperature (Tg) of 40 degrees Celsius (40 C.) or lower. A soft or rubbery core polymer may impart flexibility to a core/shell particle or a composition containing or derived from the core/shell particle. Alternatively, the core polymer may be relatively hard, or even thermosetting or thermoset. A relatively hard core polymer can impart dirt resistance or cleanability properties to a core particle so that if a portion of a core particle is exposed at the surface of a composition, it will not cause dirt buildup, or will at least be cleanable. The core polymer can be crosslinked to prevent breakage or disruption of the core particle during processing, e.g., to a film or coating, which could cause core material to be present at the surface of the film or coating.

The core polymer can comprise monomeric units derived from one or more reactive monomers or comonomers (referred to collectively herein as the "core monomer" or "core monomer"). The core monomer can include any reactive compound (e.g., monomer, dimer, trimer, oligomer, prepolymer, polymer, etc.) capable of forming a useful core polymer (meaning a homopolymer or a copolymer). Examples of useful core monomers include monofunctional reactive compounds comprising unsaturated moieties such as vinyls, e.g., (meth)acrylates, with lower (meth)acrylates being preferred, or other reactive compounds such as epoxies, alcohols, or isocyanates. Specific examples include butyl acrylate, hexyl acrylate, octyl acrylate, decyl acrylate, and butyl methacrylate with ethyl acrylate and methyl methacrylate being preferred.

The core monomer can include multi-functional reactive compounds having suitable reactive moities, e.g., two, three, or more reactive moieties such as vinyls, (meth)acrylates, epoxies, alcohols, isocyanates, etc. Such multi-functional compounds (sometimes referred to or used as crosslinkers) are known in the art of polymer chemistry, and useful examples include but are not limited to multi-functional vinyl compounds such as multifunctional (meth)acrylate compounds, multifunctional styrenes, and multifunctional allyl compounds, specifically including allyl acrylate, allyl methacrylate (AMA), butanediol diacrylate (BDDA), and hexanediol diacrylate (HDDA).

Ultraviolet radiation absorbers, UVAs, are known and commercially available chemical materials which absorb ultraviolet radiation. See, e.g. Rabek, J. F., *Photostabilization of Polymers*, 203–42 (1990), incorporated herein by reference. A variety of UVAs are known and commercially available, and can be prepared by known methods. See id A UVA can preferably be soluble in a core polymer, and can be chosen to have desired UV-absorption properties for a given application of the core/shell particles. Examples of UVAs include benzophenones, benzotriazoles, triazines, cinnamates, cyanoacrylates dicyano ethylenes, and para-aminobenzoates. For protecting a PVC substrate, preferred UVAs include benzotriazoles and benzophenones.

The UVA can be included in, contained by, or attached to the core particle in any configuration, and in any chemical or physical manner. A UVA can be a relatively low molecular weight compound dispersed in, not chemically attached to, the core polymer. Such dispersible UVAs are commercially available, with a single example being TINUVIN 1130, from Ciba Specialties Corp.

Optionally, a UVA can be functionalized with one or more reactive moieties to provide a reactive, monomeric UVA which can be included in and reacted with the core monomer to become chemically incorporated into the core polymer as a monomeric unit of the backbone or as a group pendant from the core polymer. Suitable reactive moieties include unsaturated moieties such as vinyls, e.g., (meth)acrylate and styrene, or other useful reactive moieties such as alcohols, isocyanates, epoxies, etc. Specific examples of functionalized UVAs include (meth)acrylate-functionalized UVAs such as (meth)acrylate-functional benzotriazoles and benzophenones. These compounds are well know, can be prepared by known methods, and are commercially available, e.g., NORBLOC UVAs such as NORBLOC 7966.

A core particle can be prepared from any useful amounts of various core monomers, reactive (monomeric) UVA, non-reactive (dispersible) UVA, and crosslinker. Useful amounts of these different ingredients can be from about 50 to 98 parts by weight core monomer based on the total weight of the core particle, preferably from about 65 to 95 parts by weight, and more preferably from about 75 to 90 parts by weight core monomer (for purposes of these ranges the monomer does not include reactive (monomeric) UVA), and up to about 5 weight percent crosslinker, preferably from about 0.1 to 3 weight percent crosslinker, e.g., from about 0.2 to about 2 weight percent crosslinker, based on the total weight of the core particle. The amount of UVA included in a core particle can be any useful amount, depending on factors such as the chemistry of the UVA, the substrate, the core monomer, etc. In general, UVA can be included in a core particle in an amount in the range from about 2 to 50 parts by weight UVA based on the total weight of the core particle, preferably from about 5 to 35 parts by weight UVA, and more preferably from about 10 to 25 parts by weight; these ranges are the same whether the UVA is monomeric, i.e., reactive with the core monomer, or non-reactive. A preferred core polymer can be prepared from a single acrylate or (meth)acrylate monomer, and optionally a reactive UVA and crosslinker, e.g., ethyl acrylate, a (meth) acrylate-functional UVA, and crosslinker.

The polymeric shell takes the form of a polymeric material disposed on the core, preferably completely surrounding (e.g., encapsulating) the core. Still, it is possible for production processes to result in particles wherein the polymeric shell does not completely surround the core, but only partially covers the core, leaving a portion of the core exposed.

The polymeric shell comprises a polymeric material (shell polymer) useful for a chosen core/shell particle and application, to provide desired physical, mechanical, or chemical properties. The shell polymer may be chosen to be a thermoplastic polymer such as one having a Tg sufficiently high to yield a powder composition that flows freely, without particles substantially gumming or clinging together, but still low enough that the core/shell particles and compositions or products containing or derived from the core/shell particles can be suitable for processing and still exhibit useful chemical, physical, and mechanical properties. The shell polymer can also be sufficiently hard (e.g., have a sufficiently high Tg) to exhibit dirt resistance and cleanability properties. It may be desirable to crosslink the shell polymer in order to provide desired physical properties. For instance the shell polymer could be crosslinked to increase solvent resistance, so the core/shell particles may be added to solvent-based systems while still maintaining their core/shell structure.

The polymeric shell, or components thereof, may be either compatible or incompatible with the core particle, while preferably exhibiting a useful level of adherence to the core particle. The ingredients of the polymeric shell may be chosen based on compatibility or incompatibility with a polymeric film-forming material with which the core/shell particles may be intended for use (e.g., mixed with, coated on, or otherwise associated with). If the core/shell particles are designed for use in a composition comprising a polymeric film-forming material, e.g., a fluoropolymer, the polymeric shell can preferably be, but is not required to be, compatible with that polymeric film-forming material.

Monomers used to prepare the shell polymer (shell monomers) can be chosen to provide a polymeric shell according to the above considerations, e.g., to provide desired physical properties such as hardness or softness, or compatibility or cleanability properties, and can be chosen to be thermoplastic, thermosetting or crosslinked. Preferred shell monomers can include (meth)acrylate monomers such as methyl methacrylate (MMA), methyl acrylate, ethyl methacrylate, ethyl acrylate (EA), and mixtures of these. Particularly preferred shell monomers include MMA and EA.

Selected shell monomers can be included in a variety of useful amounts, with preferred amounts of methyl methylacrylate and ethyl acrylate being in the range from 70:30 to 95:5 (MMA:EA) (by weight), more preferably in the range from about 80:20 to 90:10, MMA:EA.

The amounts (by weight) of core particle and polymeric shell in a core/shell particle can be any amounts of each which are found to be useful for a particular application, and to provide desired physical or mechanical properties such as flexibility or cleanability, with an exemplary range being from about 1:1 to 1:9 parts by weight core particle per parts by weight polymeric shell (core:shell). Preferred amounts of core particle to polymeric shell can be in the range from about 30:70 to 15:85.

Polymeric core/shell particles can be prepared from the above-described materials, by methods known in the polymer art. The chosen method can depend on a number of factors including the identity of the core and shell monomers, whether the UVA is non-reactive and therefore will be dispersed in the core polymer or reactive and will be an attached chemical component of the core polymer, or whether the core polymer or polymeric shell is thermoplastic, thermosetting, or crosslinked. Examples of suitable methods include those described, e.g., in U.S. Pat. No. 5,461,125 (Lu et al.), and Segall et al., Core-Shell Structured Latex Particles. II. Synthesis and Characterization of Poly(n-butyl acrylate)/Poly(benzyl methacrylate-styrene) Structured Latex Particles, J. Applied Poly Sci. 58, 401–417 (1995), incorporated herein by reference. Specifically, the core/shell particles can be prepared by semi-continuous or two-stage emulsion polymerization methods, wherein a first polymerization produces a core particle comprising the UVA, and by a second polymerization a polymeric shell is formed on the core.

Preferred methods for preparing core/shell particles can produce an aqueous latex comprising a dispersion of core/shell particles in water. The core/shell particles can be present in a range of differently shaped and sized particles, typically having an average (mean) size (diameter) in the range from about 40 to 200 nanometers. The size of core/shell particles can be measured by known analytical methods, for example by light scattering methods using a light scattering apparatus, such as a COULTER N4 MD submicron particle analyzer.

The core/shell particles can be combined with a polymeric film-forming material, and processed to film-forming, UV-absorbing chemical compositions.

Polymeric film-forming materials are well known, and are described throughout the patent and scientific literature; See e.g., Organic Coatings: Science and Technology, Wicks, Jones, and Pappas 35–48 (1992), and Encyclopedia of Polymer Science and Engineering, Supplement Volume, pp. 53–59 (1989), both of which are incorporated herein by reference. Polymeric film-forming materials can typically be considered to be polymeric material that can be formed into a continuous coating or film (e.g., a solid), e.g., by drying with removal of solvent, by chemical reaction, or by melting or fusing. The polymeric film-forming material can be in any useful form, such as a solid (e.g., a powder), a liquid (e.g., a high solids liquid such as a polymeric resin or a low solids liquid such as an aqueous latex), or any combination of these or other forms. The polymeric film-forming material can be reactive or non-reactive, thermoplastic, thermosetting, or otherwise polymerizable, and can be either compatible or incompatible with either the polymeric shell or the core particle. The polymeric film-forming material can have any useful chemistry, including chemistries similar to or identical to a component of the core or polymeric shells. Examples of some suitable polymeric film-forming materials include but are not limited to polyvinyl chloride, polyamide, polyester, polyacrylate, polymethacrylate, polyethylene, polypropylene, fluoropolymers, and mixtures of one or more of these.

The core/shell particles can be particularly useful with a fluoropolymer. Fluoropolymers and their preparation are well known. Examples of fluoropolymers include thermoplastic fluoropolymers such as those available in the form of fluoropolymer powders and fluoropolymer latices. Latices can for some applications be preferred over powders, because latices can be combined with a core/shell particle latex and then processed further, e.g., spray dried to form agglomerate particles as described infra.

Specific examples of useful thermoplastic fluoropolymers include homopolymers and copolymers comprising monomeric units derived from fluorinated monomers such as vinylidene fluoride (VF2), hexafluoropropene (HFP), chlorotrifluoroethylene (CTFE), vinyl fluoride (VF), trifluoroethylene (TrFE), and tetrafluoroethylene (TFE), among others, optionally in combination with one or more other non-fluorinated monomer. In general, any amounts of these and other fluorinated and non-fluorinated comonomers can be used to prepare a fluoropolymer. Particularly preferred fluoropolymers can include fluoropolymer prepared from vinylidene fluoride and HFP, with the amounts of VF2 and HFP being approximately 80 to 100 weight percent VF2 and 0 to 20 weight percent HFP, with preferred fluoropolymers being prepared from 95 to 100 wt % VF2 and 0 to 5 wt % HFP. Such fluoropolymers are available in the form of latices, typically having mean particle sizes in the range from 200 to 400 nanometers.

Commercially available fluoropolymer powders and latices include THV-500P fluoroterpolymer powder and KEL-F 3700 from Dyneon, of St. Paul, Minn., KYNAR PVDF homo- and copolymer powders, and KYNAR 32 PVDF latex from Elf Atochem.

The polymeric film-forming material may be combined with the core-shell particles while either material is in any physical form or during any stage of processing, for example when the core/shell particles exist within a latex, or as a powder of core/shell particles or their agglomerates, etc. Alternatively, the core-shell particles may be added to a liquid or solid polymeric film-forming material, followed by extrusion. These and other types of compositions are described in Assignee's copending United States Patent Application, entitled Polymeric Compositions, having U.S. Ser. No. 09/371,070, now U.S. Pat. No. 6,251,521, which was filed on even date herewith and which is incorporated herein by reference.

The relative amounts of core/shell particles and polymeric film-forming materials in a given composition can be any amounts of each that are found to be useful, with amounts for any particular application depending on factors such as the desired application or product construction, e.g., the physical or mechanical properties desired of a composition or material prepared from the core/shell particles, the chemistries of the core and the polymeric shell, the chemistry of the polymeric film-forming material, the choice of processing methods used, etc.

An exemplary composition of the invention is an aqueous latex containing core/shell particles and particles of polymeric film-forming material e.g., in the form of dispersed polymeric particles. In a preferred embodiment, a latex containing core/shell particles can be combined with a fluoropolymer latex. It can be preferable for the latices to be miscible with one another, and to be suitably stable in the form of a combined latex. "Miscible" with respect to latices means that in combining the latices, a dispersion is maintained and the combination of the two separate latices does not cause coagulation. (Coagulation of the latices can sometimes be prevented by pH adjustment prior to mixing or by adding one latex to another very slowly.)

Aqueous latices can have solids contents as known in the latex and polymer arts, and can be prepared, combined, and processed into mixtures or other compositions by known methods. The latex may be processed as desired, for example dried by known methods to form a powder, or applied as a water-based coating to form a film upon drying. If applied as a coating and dried, the latex coating can be dried to remove the water at one temperature, e.g., 66° C., followed by another heating step where the polymeric components are melted or fused together to form a continuous film or coating.

It will be appreciated by a skilled artisan that a latex composition comprising core/shell particles and polymeric film-forming material can include other ingredients or additives useful in the production or processing of latices and films. The chosen ingredients or additives can depend on the desired use of the latex, but can include foam control agents, coalescing aids, anti-fungal agents, rheology control materials such as thickeners, pigments, leveling agents, etc.

Preferred methods for drying a latex which contains core/shell particles (alone or with another material) include spray drying methods. During spray-drying, latex particles tend to fuse together to form larger agglomerate particles composed of the individual latex particles. A latex of core/shell particles and particles of a polymeric film-forming material, if spray-dried, will typically produce agglomerate particles composed of particles of the polymeric film-forming material fused with core/shell particles.

Agglomerate particles can preferably exist as a free-flowing powder having a combination of particle size, thermoplastic properties (e.g., melt viscosity), and thermal stability, which allow the particles to be processed into a desired product construction. Spray-drying can produce agglomerate particles having a range of sizes, and the size of the agglomerate particles can be any size capable of being processed into a useful product. After spray drying, agglomerate particles can be graded to obtain a desired, e.g., narrow, size distribution. An example of a useful size range for agglomerate particles can be in the range from about 10 to 200 micrometers ($\mu$m), more preferably from about 10 to 70 $\mu$m. Although particles outside of these size ranges may also be useful, particles smaller than 10 $\mu$m may present explosion hazards during powder coating, and particles larger than 200 $\mu$m may be difficult to electrostatically charge for powder coating, and, if powder coated, may produce an overly thick particle layer that may be difficult to fuse.

Figure 2:
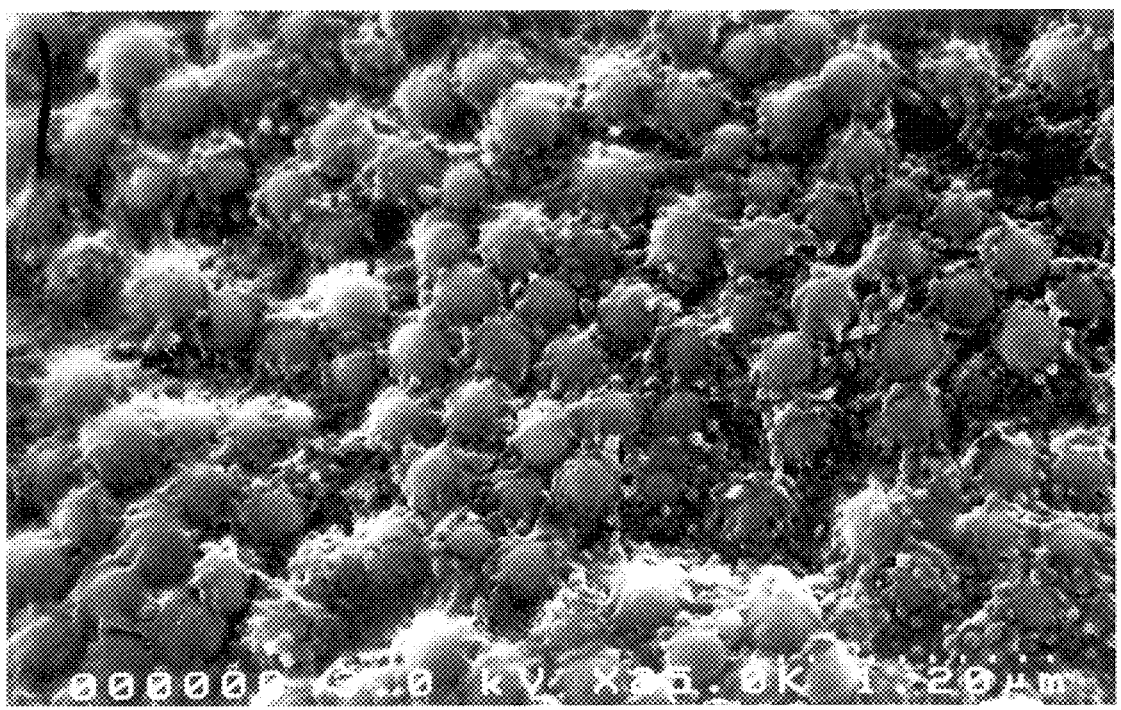
FIG. 2 is an SEM photo at 3.0 kv×25.0K magnification containing the surface of agglomerate particles prepared by spray drying a latex of core/shell particles and fluoropolymer particles.
Figure 3:
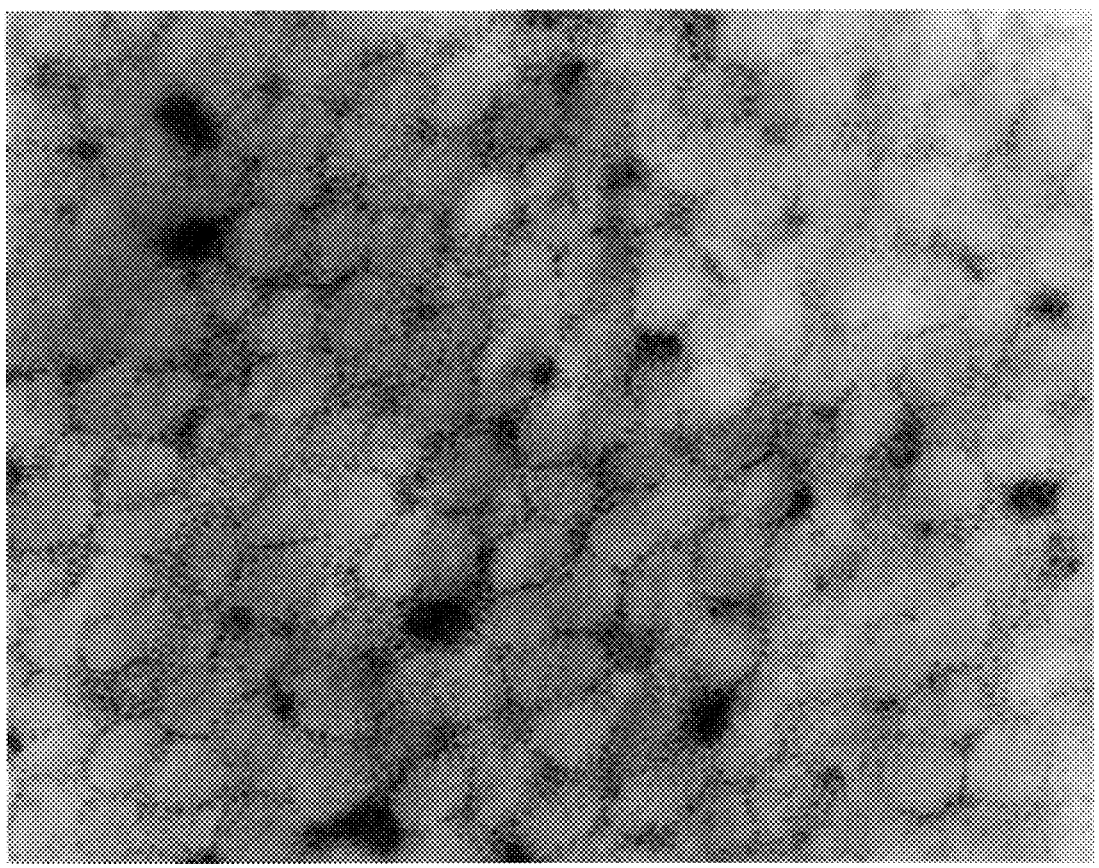
FIG. 3 is a transmission electron micrograph (TEM) taken at 60,000 times magnification of a multiphase film prepared according to example. The smaller dark, circular regions are domains of the polymeric core phase of the core/polymeric shell (dyed with $RuO_4$); the core phase domains are surrounded by lighter domains of polymeric shell. The larger domains, generally relatively light, and generally not containing domains of the darker core polymer phase are domains of a fluoropolymer phase.
Figure 4:
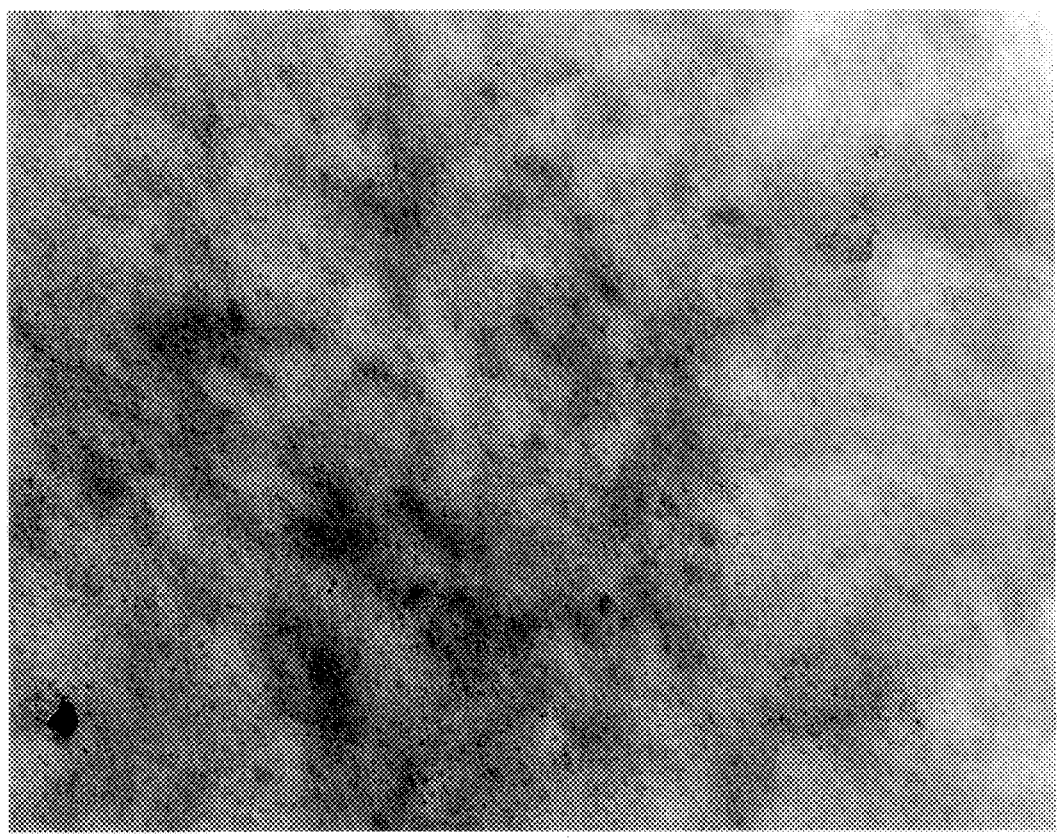
FIG. 4 is a transmission electron micrograph (TEM) taken at 60,000 times magnification of a multiphase film prepared according to Comparative Example 2. The small phase domains are of the core particle phase; the larger, nondistinct, essentially continuous phase comprises a mixture of polymeric shell and fluoropolymer.

Preferred agglomerate particles are shown in FIGS. 1 and 2. FIG. 1 shows a number of agglomerate particles. The photomicrograph of FIG. 2 is a closeup of a single agglomerate particle from FIG. 1. These photomicrographs show agglomerate particles comprised of core/shell particles and fluoropolymer particles fused together. In FIG. 2, the fluoropolymer particles are the larger spherical particles, and the smaller spherical particles attached to and surrounding the larger fluoropolymer particles are the core/shell particles.

A skilled artisan will appreciate that a powder composition comprising the core/shell particles can additionally include, in understood amounts, other ingredients known to facilitate the production or processing of a powder composition, such as plasticizers, stabilizers, flow aids to improve handling and processability (e.g., silica), pigments, and extenders.

Another exemplary composition of the invention is a multiphase polymeric composition which contains a polymeric core phase, a polymeric shell phase, and a polymeric film-forming phase, e.g., in the form of a film or a coating, and wherein the core phase comprises a UVA. Preferably, the composition exhibits a multiphase morphology wherein core phase domains and polymeric film-forming material phase domains do not substantially contact one another, but are substantially or entirely separated from each other by polymeric shell phase domains, e.g., both polymeric film-forming material phase domains and core phase domains contact polymeric shell phase domains, but do not significantly contact each other. Of course in practice there may be some degree of contact between domains of the core particle phase and the polymeric film-forming material phase, e.g., due to imperfect processing of the core/shell particles or due to breakage during processing, but this type of inadvertent contact will typically be kept to insubstantial levels.

The core/shell particles used in this preferred morphology can be particularly useful for allowing incorporation of a core particle material into a polymeric film-forming material with which the core particle material (e.g., a core particle, core polymer, or a UVA contained in a core particle) is not compatible. The described morphology provides a polymeric composition that is thermodynamically stable, because incompatible phases, e.g., the core phase and the polymeric film-forming material phase, are separated by the polymeric shell phase; the incompatible phases do not contact each other, thus resulting in thermodynamic stability and reducing the tendency of the multiphase composition to change morphology over time.

In these compositions, the core phase, the polymeric shell phase, and the polymeric film-forming material phase can be any of those materials described above, and can be chosen to provide particular properties for a desired application. Preferred multiphase compositions can include ingredients having appropriate chemistries for a particular application, and in appropriate amounts, to provide desired properties such as flexibility, weather resistance, thermodynamic stability, and adhesion to a substrate or tie-layer). In a preferred multiphase composition, the amounts of polymeric core phase, polymeric shell phase, and polymeric film-forming material phase can be sufficient to exhibit one or more of the following: flexibility, ultraviolet radiation absorption, dirt and water resistance, prevention of plasticizer blooming or bleeding from a substrate, and minimization of blooming, bleeding, or other migration of UVA from the composition. Because these properties can be dependent on a number of factors, such as the particular chemistries of the different components, a broad range of amounts of the different ingredients may be useful. An exemplary range can be from about 80:20 to 10:90 (by weight) combined polymeric core and polymeric shell phases, per polymeric film-forming material phase. Preferred amounts can be in the range from about 20:80 to 60:40 (combined polymeric core and shell phases: polymeric film-forming material phase).

As one example, a multiphase polymeric composition may be used as a topcoat to be applied to a flexible substrate exposed to outdoor conditions. Such a topcoat can include ingredients including polymeric core phase, polymeric shell phase, and polymeric film-forming material phase, chosen to provide properties such as weatherability, durability, dirt resistance, water resistance, flexibility, toughness, adhesion to a desired substrate, barrier properties (e.g., resistance to plasticizers), compatibility between different phases, thermodynamic stability, etc. A preferred polymeric core phase for use in a topcoat can be of a rubbery crosslinked material which provides flexibility to the final construction, without brittleness. A polymeric shell phase for a topcoat can be chosen, e.g., to provide chosen properties such as cleanability, and to enhance adhesion between the multiphase polymeric composition and a chosen substrate such as PVC. The polymeric film-forming material can be chosen to add other specifically desired properties, e.g., a fluoropolymer may be chosen to provide weatherability, dirt and water resistance, and cleanability. The polymeric shell phase can preferably be, but is not required to be, compatible with the film-forming polymeric material phase. Preferred polymeric shell phase materials that are compatible with many fluoropolymers can have a Tg below about 105 C., with Tgs in the range from about 40 C. to 90 C. being particularly preferred.

A specific example of a preferred multiphase composition is a film comprising separate phase domains of a poly(ethylacrylate) core phase, a poly(meth)acrylate shell phase, and fluoropolymer. Both the fluoropolymer and the polymeric core phases can be compatible with the polymeric shell phase, but the fluoropolymer phase may or may not be compatible with the polymeric core phase.

It has been found that such multiphase polymeric compositions comprising a polymeric core phase separated from a polymeric film-forming phase by a polymeric shell phase can exhibit lasting UVA protection due to reduced migration loss (e.g., bleeding or blooming) of the UVA; thermodynamic stability; and improved resistance to water (e.g., reduced water sensitivity), compared to chemical compositions containing the same amounts of chemically identical ingredients but exhibiting a different morphology. The improved properties are believed to be due, at least in part, to the fact that the UVA in the polymeric core phase is surrounded and contained by polymeric shell phase (and is optionally and preferably chemically bound to the core polymer). Further, separation of incompatible phases can improve thermodynamic stability, which leads to improved water resistance (e.g., less water sensitivity). See, e.g., Comparative Example 2, infra.

Multiphase polymeric compositions having the preferred morphology, optionally including a polymeric core phase that is incompatible with a polymeric film-forming material phase, can be prepared by any successful method. As an example, the morphology can be achieved by providing a film or coating comprising core/shell particles and particles of the polymeric film-forming material, and processing the film or coating such that polymeric components of the composition fuse together or solidify into a preferably continuous, cohesive film or coating. The process can be practiced with care to maintain the core/shell structure, e.g., prevent dissolution of the core/shell particles, to achieve the preferred multiphase morphology.

More specifically, by one example of such a method, a multiphase composition having the preferred morphology can be achieved by providing a film or coating of a latex comprising core/shell particles and particles of the polymeric film-forming material, followed by drying to form a film.

The preferred morphology can also be achieved by powder coating particles comprising core/shell particles and particles of the polymeric film-forming material, (e.g., agglomerate particles obtained by spray-drying), e.g., onto a flexible substrate, followed by fusing. Fusing should take place at a temperature that is above the melting point of any crystalline polymeric phase of the powder, and above the Tg of any amorphous polymeric phase, to a temperature sufficient to melt and thereby fuse the particles into a preferably continuous, multiphase polymeric film or coating, to an extent that the core phase does not come into substantial contact with the film-forming polymeric material phase.

Figure 5:
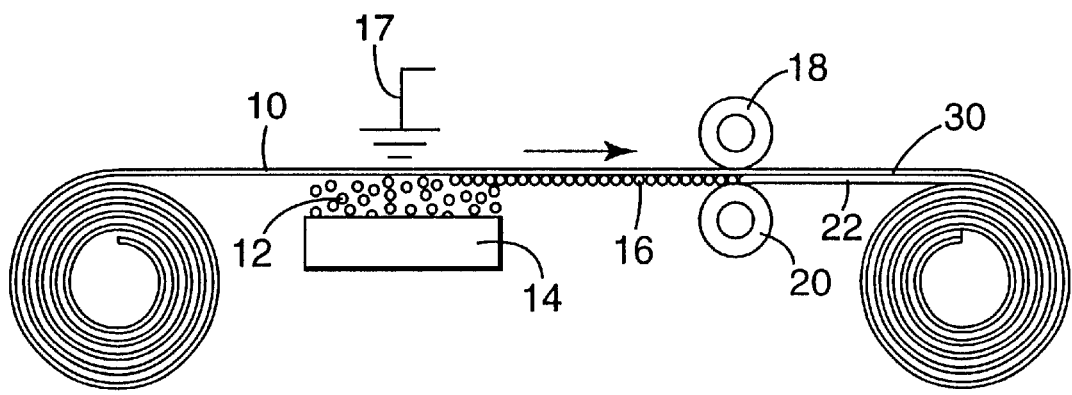
FIG. 5 is a schematic view of a method of applying a multiphase polymeric coating onto a substrate according to this invention.

FIG. 5 schematically illustrates a method of coating a powder onto a flexible substrate. Substrate 10 moves through powder cloud 12 coming from electrostatic fluidized bed powder coater 14, so that a particle layer 16 is formed on a surface of the substrate. The particles of powder cloud 12 are shown much larger than actual size for the purpose of illustration. Substrate 10 may be in the form of a long continuous web (as shown), or a smaller piece of material laid on a carrier web. In a another technique (see for example "Powder Coating," edited by Nicholas P. Liberto, published by the Powder Coating Institute, Chapter 10 (1994)), powder cloud 12 can be generated by placing a powder in the chamber of the coater and passing ionized air through the powder until it fluidizes. Preferably, the powder is pre-dried in a conditioning chamber (not shown) before use. The substrate passing through powder cloud 12 can be electrostatically charged to cause the powder to be attracted to the substrate. To facilitate deposition of a uniform coating, a charge can be applied to the substrate by known methods, e.g., by corona treatment methods or by contacting the web to a material which appears higher or lower on the triboelectric series, depending on the desired polarity of the charge. A grounding plate 17 made of aluminum or another like material can be placed behind the substrate to provide a ground potential to attract the charged powder to the surface of the substrate. The coating weight of particle layer 16 can be controlled by one or more of the line speed, the voltage applied to the air supply, and the particle size of the powder. Optionally, both surfaces of a substrate may be coated by passing the substrate between two powder coaters, or by making two passes over the same coater and inverting the substrate between passes.

Although electrostatic fluidized bed powder coating is a preferred method for continuous powder coating, other types of powder coating methods such as electrostatic spray coating may also be used. Powder coating equipment is well known and complete systems are readily available commercially. A nonlimiting example of a powder coating equipment manufacturer is Electrostatic Technology Incorporated (ETI), Branford Conn., USA Again referring to FIG. 5, to fuse the coated powder into a continuous film or coating, the coated substrate passes through a nip configuration defined by heated roll 20 and backup roll 18. The nip configuration applies heat and pressure simultaneously to fuse the powder particles of particle layer 16 into a continuous, multiphase polymeric layer 22, and bond the layer to substrate 10, thereby forming a composite sheet material 30. No preheating stage is required prior to the nip, but such a stage may be useful if desired, e.g., to achieve a higher line speed. Heated roll 20 is typically made of metal, and its outer surface is preferably covered with a material having release properties such as poly(tetrafluoroethylene) to prevent transfer of either melted thermoplastic powder or fused thermoplastic layer from the substrate to the roll. Backup roll 18 preferably has a resilient surface, such as rubber.

The temperature and pressure of the heated roll can be chosen to be sufficient enough to fuse the coated powder into a continuous layer, yet not so high as to distort or degrade the substrate. If substrate 10 is a thermoplastic film or other material likely to soften or distort at the elevated temperatures in the nip, support can be provided to the substrate in the form of a carrier web, liner, or belt system (not shown). The backup roll may be at ambient temperature, it may be heated to facilitate fusing, or it may be chilled to provide further thermal protection for the substrate.

As an alternative to the nip configuration shown in FIG. 5, simultaneous heat and pressure may be applied by other suitable means, such as a heated press, or by a belt configuration.

While the above-detailed processes can be used to prepare a multilayer polymeric composition having the described preferred morphology, this morphology may not be achieved by just any coating or film-forming process or method. For instance, the described preferred morphology may not necessarily result from the same composition (i.e., identical chemical ingredients in identical amounts) being prepared into a film, if prepared by other processing methods. If, as described, a latex of the core/shell particles is blended with a latex of particles comprising the polymeric film-forming material, followed by spray drying to produce agglomerate particles, the resulting agglomerate particles can be powder coated and fused to achieve a composition with the desired morphology. If, on the other hand, the latices are spray dried separately, and then blended into a powder mixture and powder coated, the desired morphology may not necessarily be achieved, but a different morphology might be achieved which although possibly useful, may not exhibit the same physical properties of the described preferred morphology. Furthermore, if the core/shell particles become dissolved or are otherwise caused to lose their core/shell structure during processing, e.g., by mixture with a solvent, sufficient heating for an extended period of time, or by exposure to any other processing condition that would cause the loss of the core/shell structure, a composition prepared by such a method may not exhibit the described preferred morphology or resultant properties. In particular, if the core/shell particles are solvent coated, it is possible that the desired morphology may not be achieved. See Comparative Example 3.

Figure 6:
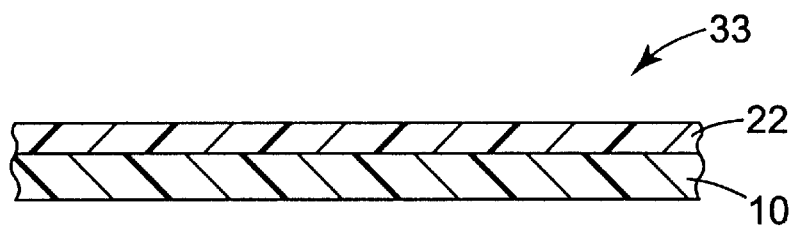
FIG. 6 is a schematic cross-sectional view illustrating a preferred embodiment of the invention.

The core/shell particles can be used to prepare various products having UV radiation absorption or blocking properties. An example is composite sheet material 33, shown in FIG. 6. Multiphase polymeric layer 22, (e.g., as a topcoat), in the form of a continuous film prepared from or containing polymeric core/shell particles, is bonded to substrate 10. The multiphase polymeric layer can be transparent or translucent in appearance, and can generally have a thickness in the range from about 12.7 µm to about 254 µm (0.5 mil to 10 mils). An example of a protective coating (topcoat) for an outdoor sign substrate can be translucent and can have a thickness in the range from 10 µm to 25.4 µm (0.4 mil to 1 mil).

Substrates that can be suitable include most any material that can benefit from protection from ultraviolet radiation, such as plastics, or materials that might otherwise be coated with a polymeric material, wherein the polymeric material can be UV-radiation resistant. Preferred substrates can be flexible two-dimensional materials capable of receiving a powder coating and capable of withstanding heat and pressure conditions used to process the powder into a coating or film. The substrate can be used in conjunction with a supporting liner, or can be internally reinforced in order to meet process requirements. The thickness of the substrate can be any useful thickness, and can preferably be in the range from about 12.7 to about 1270 µm (0.5 to 50 mil), more preferably from about 50.8 to about 762 µm (2 to 30 mil).

Preferred substrates include, flexible thermoplastic films such as those made from polyester, polyamide, polyimide, polycarbonate, plasticized polymers such as PVC, polyacrylates such as polymethyl methacrylate, polypropylene, polyethylene, and copolymers or combinations thereof. The thermoplastic film may optionally contain additional components such as pigments, fillers, reinforcing fibers or mesh, and ultraviolet absorbing agents, to provide properties important for some applications. An example of a suitable substrate for use in outdoor backlit signs and awnings is a polyester mesh scrim that has been coated on both sides with a plastisol containing PVC resin, a phthalate ester plasticizer, and pigment, and then fused. Such a substrate is commercially available under the trade name PANAFLEX, from 3M of St. Paul, Minn.

The powder may also be coated onto a release liner and optionally fused into a film. The coated liner could then be used as a casting liner to cast onto another film or coating such as a PVC plastisol or organosol. Optionally, the pre-fused film could be laminated to a previously fused organosol or plastisol film.

The substrate surface may optionally be treated to increase adhesion between a topcoat and a substrate, e.g., by etching or other treatment such as a non-polymeric, chemical agent applied to chemically modify the surface of the substrate to allow the topcoat to bond, or by application of an adhesion-promoting primer or tie-layer. Such treatment is not required, and is preferably avoided if adhesion between the substrate and the topcoat is otherwise adequate.

Figure 7:
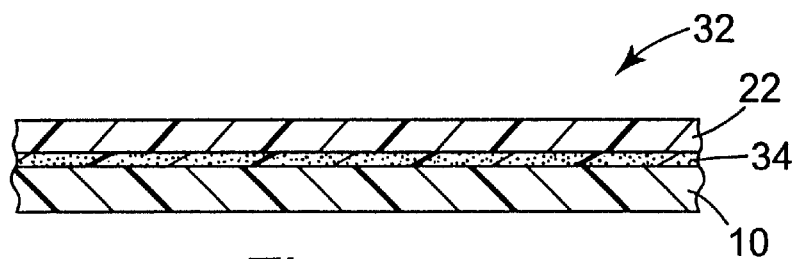
FIG. 7 is a schematic cross-sectional view illustrating a preferred embodiment of the invention.

FIG. 7 illustrates another embodiment of the invention, composite sheet material 32, comprising substrate 10, tie-layer 34, and multilayer polymeric layer 22.

In general, a tie-layer can comprise a thermoplastic or thermosetting polymeric material which demonstrates adhesion, especially high adhesion, to both the substrate and the topcoat.

A preferred tie-layer can comprise a chemical composition that will strongly adhere to both the substrate and the topcoat, and that is flexible and stable. Such a tie layer may include chemical components that are the same as or similar to those of the substrate and the topcoat. For instance, if a topcoat containing core/shell particles and fluoropolymer is to be applied to a PVC substrate, a tie-layer may include fluoropolymer and (meth)acrylate components. Such a tie-layer may be prepared and applied to the substrate by a variety of known and useful methods. A particularly preferred tie-layer of this sort can include a poly(meth)acrylate and a fluoropolymer, with polymethyl methacrylate and its ethyl acrylate copolymers being particularly preferred.

The choice of a fluoropolymer can depend on the fluoropolymer of the topcoat, but may include polyvinylidene fluoride and its hexafluoropropylene comonomers, with amounts of HFP monomer up to 40 mole percent. Other fluorinated or non-fluorinated monomers can also be included, such as chlorotrifluoroethylene and tetrafluoroethylene.

The amount of (meth)acrylate monomer versus fluoropolymer in a tie-layer can vary, but preferably the (meth)acrylate can be included in an amount in the range from about 50 to 90 weight percent, based on the total weight of (meth)acrylate monomer and fluoropolymer. If the (meth)acrylate monomer includes MMA and EA, the ratio of EA:MMA can preferably be present in a ratio in the range from 0 to 10 parts by weight EA to 90 to 100 parts by weight MMA.

A preferred method of preparing such a tie layer is by preparing a latex of the fluoropolymer, adding (meth)acrylate monomers to the latex, followed by reaction of the (meth)acrylate monomers in the presence of the fluoropolymer.

In general, a stable fluoropolymer emulsion can be provided, typically at a solids percent in the range from about 5 to 15%, e.g., about 10% solids (by weight). "Stable" means that the fluoropolymer stays well dispersed in the aqueous medium, e.g., does not coagulate. A hydrocarbon surfactant (e.g., sodium lauryl sulfate) can optionally be added to stabilize the final latex polymer. A water-soluble, free radical initiator can also be added in an amount useful to facilitate polymerization. Such initiators and their use are well known, and include potassium persulfate. The latex can be heated to a range which allows polymerization of the (meth)acrylate monomers, e.g., from about 50 to 90 C. Then, the (meth)acrylate monomer can be added at an appropriate rate, and with agitation sufficient to keep the latex relatively uniform. It has been observed that a rate of addition of the (meth)acrylate monomers of about one quarter of the total charge, per hour, over four hours, is a preferred rate of addition. This allows sufficient time for the monomers to diffuse throughout the fluoropolymer, and has been found to provide improved properties of water resistance for the tie-layer—addition that is more rapid may still provide a useful tie-layer polymer, but water resistance properties may be reduced.

Variations on this process may also prove useful, for example the fluoropolymer may be a solid dissolved in (meth)acrylate monomer, then dispersed in water and surfactant, followed by polymerization.

Polymerization of the (meth)acrylate in the presence of the fluoropolymer, can produce a latex having particles of a submicron size range, e.g., from 150 to 200 nm. Particles larger than 200 nm may be susceptible to coagulation. The latex particles can be dried and applied to the substrate by known methods. Preferably, the latex can be spray-dried to form a free-flowing-powder of agglomerate particles, by methods similar to those described above (size range typically from about 10 to 80 micrometers). This powder can preferably be powder coated onto the substrate and fused using a hot nip roller. During spray drying of the powder, a fumed silica may be added to the powder, e.g., in an amount in the range from about 0.25 to 2 weight percent, to facilitate fluidization of the powder.

EXAMPLES

Example 1

Preparation of a Polymeric UV Absorber (UVA) Having a Core/shell Structure

This example details preparation of a latex particle having a 30/70 core/shell ratio with the core composition being 17/83 Norbloc™ 7966/ethyl acrylate and the shell composition being 80/20 methyl methacrylate/ethyl acrylate. Water (331.4 g), sodium lauryl sulfate (1.5 g), isooctyl thioglycolate (0.45 g), and a mixture (premix) of ethyl acrylate (37.5 g) and Norbloc™ 7966 (7.5 g) a polymerizable UV absorber (available from Janssen Pharmaceutica, Titusville, N.J.) were charged to a reaction flask, stirred and purged with nitrogen while heating to 85–90° C. When the system was well dispersed, the batch was cooled to 75° C. and a premix of potassium persulfate initiator (0.45 g) in water (17.55 g) was added. After an initial induction period, the polymerization started and the batch temperature rose to about 80° C. After the peak temperature had been reached (about 5 to 10 minutes), the shell monomer premix consisting of methyl methacrylate (84 g), ethyl acrylate (21 g) and isooctyl thioglycolate (0.53 g) was added over about 90 minutes while the batch temperature was held at 80° C. When addition was complete, the batch was held at 80° C. for 90 minutes then cooled and filtered through cheesecloth.

The product had inherent viscosity of 0.36 deciliter per gram (dl/g) measured in tetrahydrofuran solvent. Analysis of the dried polymer by differential scanning calorimetry showed two separate glass transitions at −6° C. and 70° C.

Example 2

Preparation of a Polymeric UV Absorber (UVA) Having a Core/shell Structure and a Crosslinked Core A latex with 20/80 core/shell ratio was prepared by the procedure of Example 1 above, modified as follows. The core composition was prepared using 0.45 g allyl methacrylate, 5.01 g NORBLOC™ 7966, 24.54 g ethyl acrylate, and 0.20 g isooctyl thioglycolate. The shell monomers included 102 g methyl methacrylate, 18 g ethyl acrylate and 0.78 g isooctyl thioglycolate. The shell monomer mixture was added over a period of 90 minutes. The product had IV=0.30 dl/g and a single glass transition temperature at 82° C. The addition of allyl methacrylate to the core resulted in crosslinking of the core and disappearance of the lower Tg that was noted in Example 1.

Examples 3 and 4

Preparation of Core/Shell Latices with Alternative Polymerizable UV Absorbers

Latices with a 30/70 core/shell ratio were prepared by the procedure outlined in Example 1, modified as follows. The core compositions for these examples were prepared from polymerizable UVA and ethyl acrylate in a weight ratio of 16.7/83.3, and the shell polymer was prepared from methyl methacrylate/ethyl acrylate in a weight ratio of 80/20. The shell monomer mixture for both Example 3 and 4 contained 84 g methyl methacrylate, 21 g ethyl acrylate and 0.53 g isooctyl thioglycolate.

The core monomer mixture of Example 3 contained 37.5 g ethyl acrylate, 7.5 g CGL 104, a polymerizable benzotriazole available from Ciba Specialty Chemicals, and 0.45 g isooctyl thioglycolate. The product had IV=0.38 dl/g and showed two glass transition temperatures at −2° C. and 73° C.

In example 4, Cyasorb™ 416, a polymerizable benzophenone UV absorber available from Cytec, was substituted for the CGL 104 used in Example 3. The product had IV=0.18 dl/g and showed two glass transition temperatures at 1° C. and 73° C.

Example 5
Non Polymerizable UVA in Core/shell Particle Having a Crosslinked Core A latex with a crosslinked core containing a non polymerizable UVA was prepared using the procedure of Example 2 except Tinuvin™ 1130, a non-polymerizable benzotriazole UV absorber available from Ciba Specialty Chemicals was substituted for NORBLOC™ 7966. The product bad IV=0.30 dl/g and a single Tg at 74° C.

Comparative Example 1
Preparation of a Polymeric UV Absorber without a Core/shell Structure Homogeneous latex particles were prepared, having a composition of 80/15/5 methyl methacrylate/ethyl acrylate/Norbloc™ 7966. These particles were prepared using a two step (core/shell) process wherein the composition of the core and the shell were identical. The procedure used was similar to that used in Example 1 except that the core monomer mixture consisted of 36 g methyl methacrylate, 6.75 g ethyl acrylate, 2.25 g NORBLOC™ 7966, and 0.45 g isooctyl thioglycolate, and the shell monomer contained 84 g methyl methacrylate, 15.75 g ethyl acrylate, 5.25 g Norbloc™ 7966 and 0.53 g isooctyl thioglycolate. The product had IV of 0.31 dl/g and a single glass transition temperature at 87° C.
Preparation of Powder Coating Compositions Example 6

A latex was prepared by blending the core/shell UVA latex of Example 1 with a fluoropolymer latex consisting of Hylar™ FXH-6, a 95/5 vinylidene fluoride/hexafluoropropylene copolymer from Ausimont USA, in ratios of 80% fluoropolymer solids to 20% acrylic solids. The resulting latex mixture was then spray dried to yield agglomerate powder particles in which the two polymeric components were blended and fused on submicron scale. (See FIG. 1 and 2). Spray drying was accomplished under the following conditions on a Büchi B-191 Mini Spray Dryer (available from Brinkman Instruments, Westbury, N.Y.):

| | |
|---|---|
| Inlet Temperature: 140° C. | Outlet Temperature: 40–55° C. |
| Pressurized air flow: 550 liters/hr. | Pump Speed: 100% |
| Aspirator: 100% | Vacuum 40–50 mbar |

Comparative Example 2

A similar powder coating composition was prepared using the homogeneous latex particles prepared in Comparative Example 1 and the fluoropolymer described in Example 6.
Preparation of Powder Coated Articles The powder coating compositions prepared as described in Example 6 and Comparative Example 2 above were coated onto 10.1 cm×15.2 cm pieces of PANAFLEX™ 930 vinyl outdoor sign substrate available from 3M Company, St. Paul, Minn. A coating weight of 33 grams per square meter of the 80/20 fluoropolymer/acrylic powder blend was applied to the substrate using a laboratory-scale C-30 electrostatic fluidized bed powder coater (Electrostatic Technology, Inc., Bradford, Conn.). The voltage in the coater was set to give the desired coating weight (settings varied with the powder used), and the substrate was held over the coater for approximately 5 seconds. The coated substrate was then hand fed through a nip configuration to fuse the particle layer. The nip configuration consisted of a TEFLON-coated roll heated to 200° C. and an unheated backup roll. A piece of aluminum foil was threaded over the heated roll. The coated substrate was placed powder side down on the foil and fed through the nip at an applied air pressure of about 276 kPa (40 psi) and a line speed of 1 meter per minute. The resulting fused protective layer had a thickness of approximately 25 μm.

The same compositions were coated onto a TELFON-coated release liner and removed as a free film, which had the following UV-absorbing properties.

The ultraviolet spectra of the films were essentially identical to those of monomeric or polymeric benzotriazole UV absorbers and showed absorption maxima at 240, 298 and 336 nm due to the benzotriazole chromophore.
Preparation of Tie Layer Material A 2 liter split resin flask was fitted with a paddle stirrer, condenser, nitrogen purge, addition funnel, and temperature control. Deionized water (473 g), sodium lauryl sulfate (1.3 g) and FLUOREL™ JC3159 fluoropolymer latex (467 g) (available from Dyneon Corp, Oakdale, Minn.) were added to the reactor. The mixture was heated to 55° C. with stirring (250 rpm). Potassium persulfate (0.52 g) was then added. A monomer premix comprising methyl methacrylate (248 g), ethyl acrylate (12 g) and isooctyl thioglycolate (0.52 g) was then continuously added to the flask over a four hour period, with the temperature held at 55° C. After the four-hour addition of the monomer, the temperature was raised to 70° C. and the mixture stirred for one hour. The resulting seeded latex was filtered through dry cheesecloth. The pH of the resulting latex was 3.4 and the solids content was 30.6%. The inherent viscosity (IV) was 0.87 dl/g in methyl ethyl ketone (MEK) and the average particle diameter was 179 nm as determined using light-scattering a COULTER N4 MD particle analyzer.

The seeded latex was spray dried by conventional methods discussed in Example 6. The resulting fusible thermoplastic powder was suitable for powder coating on a substrate.
Preparation of Powder Coated Articles with a Tie Layer The spray-dried powder tie layer material prepared as described above was powder coated on to 10.1 cm×15.2 cm pieces of PANAFLEX™ 930 vinyl outdoor sign substrate available from 3M Company, St. Paul, Minn. A coating weight of 13 grams per square meter of the spray-dried latex powder was applied to the substrate using a laboratory-scale C-30 electrostatic fluidized bed powder coater (Electrostatic Technology, Inc., Bradford, Conn.). The voltage in the coater was set to give the desired coating weight (settings varied with the powder used), and the substrate was held over the coater for approximately 5 seconds. The coated substrate was then hand fed through a nip configuration to fuse the particle layer. The nip configuration consisted of a TEFLON-coated metal roll heated to 200° C. and an unheated backup roll. A piece of aluminum foil was threaded over the heated roll. The coated substrate was placed powder side down on the foil and fed through the nip at an applied air pressure of about 276 kPa (40 psi) and a line speed of 1 meter per minute. The resulting fused tie layer had a thickness of approximately 12 μm, and was discontinuous at this coating weight.

The powder coating composition that was prepared as described in Example 6 above was powder coated over the fused tie layer. A coating weight of 33 grams per square meter of the 80/20 fluoropolymer/acrylic powder blend was applied to the substrate using a laboratory-scale C-30 electrostatic fluidized bed powder coater as described above. The coated substrate was hand fed through a nip configuration to fuse the particle layer using the methods described previously. The resulting fused protective topcoat layer had a thickness of approximately 25 μm.

Example 7
Preparation of Cast Films Using a Core/shell Latex

Latices were prepared by blending the core/shell UVA latex of Example 1 with a fluoropolymer emulsion of HYLAR™ FXH-6, a 95/5 vinylidene fluoride/hexafluoropropylene copolymer from Ausimont USA, in ratios of 80% fluoropolymer solids to 20% acrylic solids. This latex blend was bar-coated onto a hydrophylically-primed polyester liner at a wet thickness of 100 microns. The coating was then dried in a 67° C. oven for 3 minutes before transfer to a 180° C. oven for 1 minute. The resultant continuous, dry film was 10–15 microns thick.

Comparative Example 3
Preparation of Solvent Cast Films

The powder coating composition prepared according to Example 6 was dissolved in acetone (44° C.) in an amount sufficient to prepare a 10% solids solution. The resultant solution was bar-coated onto a polyester liner at a wet thickness of ~100 microns. The coating was then heated for 1 minute at 190° C. to yield a dry film having a thickness of approximately 10–15 microns.

Example 8
Resistance of Coated Films to Hot Water

The water resistance of filsed films was evaluated by immersion of fused film samples into deionized water at 66° C. for 16 hours. This test simulates long term exposure to hot and humid conditions. The haze or clarity of fused films was measured before and after immersion using a Gardner PG 5500 Digital Photometric Unit and ASTM D1003 as a standard test method.

Samples were prepared by powder coating the blended test materials prepared according to Example 6 and Comparative Example 2 onto a TEFLON-coated flexible substrate and then fusing the coatings using the methods described previously (see Preparation of Powder Coated Articles). The fused films (25 μm thick) were then removed from the TEFLON-coated substrate and evaluated for water resistance. The results for the Example 6 composition containing core/shell UVA particles (from Example 1) and, the Comparative Example 2 composition, containing homogeneous UVA-containing particles (Comparative Example 1) are shown in the Table 1 below. It is worth noting that the absolute haze is not particularly relevant, because a film may be useful with various levels of haze or translucence; this test instead measures stability by tracking a change, e.g., increase, in haze.

TABLE 1

| Powder Coating Composition | Haze Before Immersion | Haze After Immersion | Difference |
| --- | --- | --- | --- |
| Example 6 | 25.6% | 28.1% | 2.5% |
| Comp. Ex. 2 | 22.0% | 51.6% | 29.6% |

The results in Table 1 indicate that the film containing the core/shell UVA (Ex. 6) exhibited much less change in haze caused by the immersion challenge. This indicates that when powder coated and fused, the core/shell particle containing a UV absorber in the core, can be included in a fluoropolymer to produce a more thermodynamically stable multiphase composition, than homogeneous UV absorbers.

Additionally, the core/shell particles showed improved flexibility in qualitative comparison to the homogeneous particles in coated films made with the fluoropolymer/acrylic blends. Folding (using finger pressure) the coated substrate 180 degrees to form a sharp crease tested the coating flexibility. The substrates were creased with the coating on the inside to test the coating versus compressive forces and with the coating on the outside to test versus extensional forces. The film containing the homogeneous acrylic cracked under both compression and extension, the film containing the core/shell did not crack under either stress.

The water resistance of the latex cast films (Example 7) and the solvent cast films (Comparative Example 3) are shown in Table 2 below.

TABLE 2

| Composition | Haze Before Immersion | Haze After Immersion | Difference |
| --- | --- | --- | --- |
| Example 7 | 1.1% | 11.2% | 10.1% |
| Comp. Ex. 3 | 1.5% | 13.5% | 12.0% |

What is claimed is:

1. A multilayer article comprising:
   a flexible substrate, and
   a multiphase polymeric composition comprising a polymeric core phase, a polymeric shell phase, and a polymeric film-forming phase,
   wherein the polymeric core phase comprises an ultraviolet absorber,
   wherein the polymeric film-forming phase comprises fluoropolymer,
   wherein the polymeric core phase and the polymeric film-forming phase do not substantially contact one another, but both the polymeric core phase and the polymeric film-forming phase contact the polymeric shell phase.

2. The article of claim 1 wherein the polymeric core phase is incompatible with the polymeric film-forming phase.

3. The article of claim 2 wherein the multiphase polymeric composition is thermodynamically stable.

4. The article of claim 1 wherein the polymeric core phase comprises a core polymer having a Tg that is less than 40° C.

5. The article of claim 4 wherein the polymer is derived from monomers consisting essentially of ethyl acrylate, and optional (meth)acrylate-functional ultraviolet absorber and crosslinker.

6. The article of claim 1 wherein the multiphase polymeric composition is flexible.

7. The article of claim 1 wherein the polymeric shell phase comprises a shell polymer, which comprises the reaction product of monomers comprising ethyl acrylate and methyl methacrylate.

8. The article of claim 1 wherein the multi-phase polymeric composition is disposed on a surface of the substrate.

9. The article of claim 1 comprising a tie-layer between the substrate and the multiphase polymeric composition.

10. The article of claim 9 wherein the tie-layer is flexible.

11. The article of claim 9 wherein the tie layer comprises a polymeric composition comprising a poly(meth)acrylate and a fluoropolymer.

12. The article of claim 9 wherein the tie-layer is prepared according to a method comprising the steps of:
    providing a fluoropolymer latex
    adding (meth)acrylate monomer to the latex
    polymerizing the (meth)acrylate monomer in the presence of the fluoropolymer.

13. The article of claim 12 wherein the method further comprises the step of spray drying the latex to form a powder.

14. The article of claim 13 wherein the powder is powder coated and fused onto the substrate to form the tie-layer.

15. The article of claim 14 wherein the multiphase polymeric composition is applied to the tie layer according to steps comprising:
    powder coating agglomerate particles comprising fused polymeric core/shell particles and particles of polymeric film-forming method, and
    fusing the powder-coated agglomerate particles.

16. The article of claim 1 wherein the substrate comprises a thermoplastic film.

17. The article of claim 16 wherein the substrate comprises polyvinyl chloride.

18. The article of claim 1 wherein the multiphase polymeric composition is translucent.

19. The article of claim 1, wherein the polymeric core phase further comprises monomers into which the ultraviolet absorber becomes chemically incorporated to form a core polymer.

* * * * *

UNITED STATES PATENT AND TRADEMARK OFFICE
CERTIFICATE OF CORRECTION

PATENT NO.    : 6,352,764 B1
DATED         : March 5, 2002
INVENTOR(S)   : Andrus, Milton H. Jr.

It is certified that error appears in the above-identified patent and that said Letters Patent is hereby corrected as shown below:

<u>Title page,</u>
OTHER PUBLICATIONS, please delete "Structural" and insert in place thereof -- Structured --.

<u>Column 17,</u>
Line 14, delete "bad" and insert in place thereof -- had --.

<u>Column 19,</u>
Line 27, delete "filsed" and insert in place thereof -- fused --.

Signed and Sealed this

Twentieth Day of August, 2002

Attest:

Attesting Officer

JAMES E. ROGAN
*Director of the United States Patent and Trademark Office*